(12) United States Patent
Harter et al.

(10) Patent No.: US 12,097,582 B2
(45) Date of Patent: Sep. 24, 2024

(54) CRANKSHAFT REPAIR SYSTEM AND METHOD

(71) Applicant: Transportation IP Holdings, LLC, Norwalk, CT (US)

(72) Inventors: David Harter, Grove City, PA (US); Zackary Quidetto, Grove City, PA (US); David Lachendro, Grove City, PA (US); Beau Fisher, Grove City, PA (US); Paul Knapik, Grove City, PA (US); Justin Fowler, Grove City, PA (US); William Gray, Grove City, PA (US); John P. Dowell, Grove City, PA (US)

(73) Assignee: Transportation IP Holdings, LLC, Norwalk, CT (US)

( * ) Notice: Subject to any disclaimer, the term of this patent is extended or adjusted under 35 U.S.C. 154(b) by 0 days.

(21) Appl. No.: 18/166,876

(22) Filed: Feb. 9, 2023

(65) Prior Publication Data

US 2024/0269784 A1    Aug. 15, 2024

(51) Int. Cl.
 *B23P 6/00* (2006.01)
 *B23K 26/342* (2014.01)
 *F16C 3/06* (2006.01)

(52) U.S. Cl.
 CPC .............. *B23P 6/00* (2013.01); *B23K 26/342* (2015.10); *B23P 2700/07* (2013.01); *F16C 3/06* (2013.01)

(58) Field of Classification Search
 CPC ...... B23P 6/00; B23P 2700/07; B23K 26/342; F16C 3/06
 See application file for complete search history.

(56) References Cited

U.S. PATENT DOCUMENTS

| | | | |
|---|---|---|---|
| 5,915,743 A * | 6/1999 | Palma ...................... | B23P 6/00 29/527.4 |
| 2005/0132569 A1 | 6/2005 | Clark et al. | |
| 2015/0165557 A1 | 6/2015 | Torims | |
| 2015/0217414 A1 | 8/2015 | Luick et al. | |
| 2016/0340762 A1 * | 11/2016 | Cavanaugh ............. | C22C 38/42 |

FOREIGN PATENT DOCUMENTS

RU          2007287 C1 *  2/1994  ............... B23P 6/00

* cited by examiner

*Primary Examiner* — Thomas C Diaz
(74) *Attorney, Agent, or Firm* — K&L Gates LLP

(57) ABSTRACT

A crankshaft for an internal combustion engine is provided and may include crank pins, crank journals, and webs extending between the crank pins and the crank journals. Each web further may include a web surface on each side of the web. On the web surface, a repair region is provided with an undercut formed in the web. Included in the crankshaft is a cladding deposit that is fused to the web surface in the repair region of the crankshaft.

18 Claims, 7 Drawing Sheets

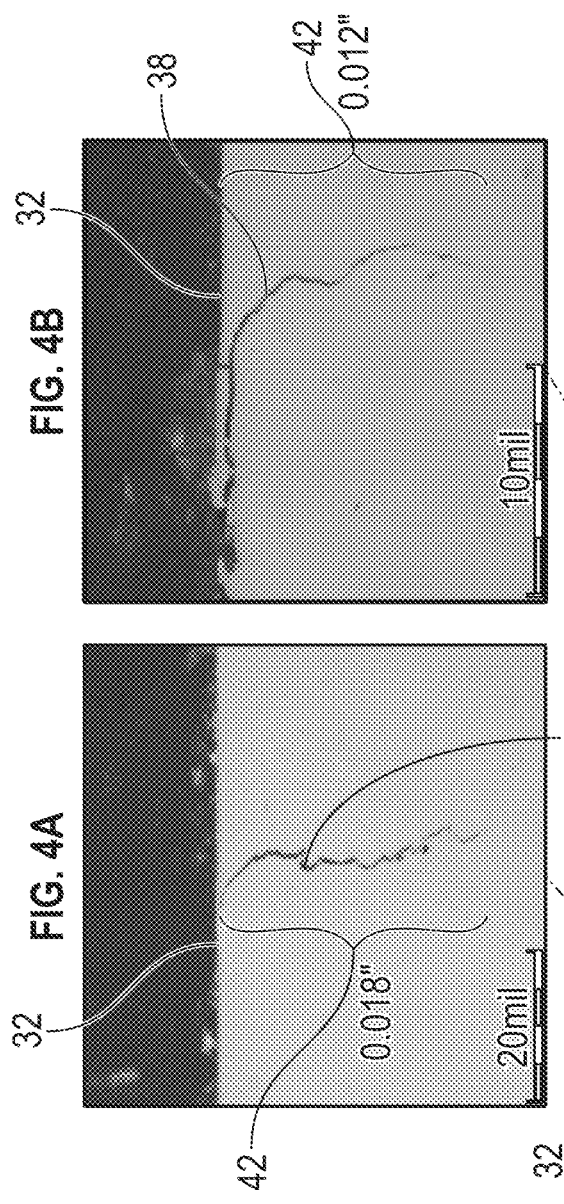
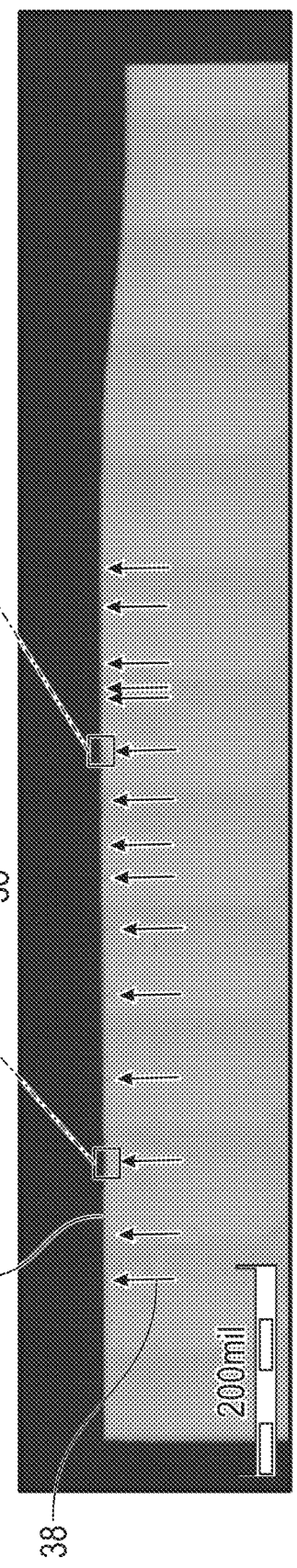
FIG. 4A
FIG. 4B
FIG. 4C
B156 (Unetched) - Multiple Cracks Present (Indicated by Arrows)

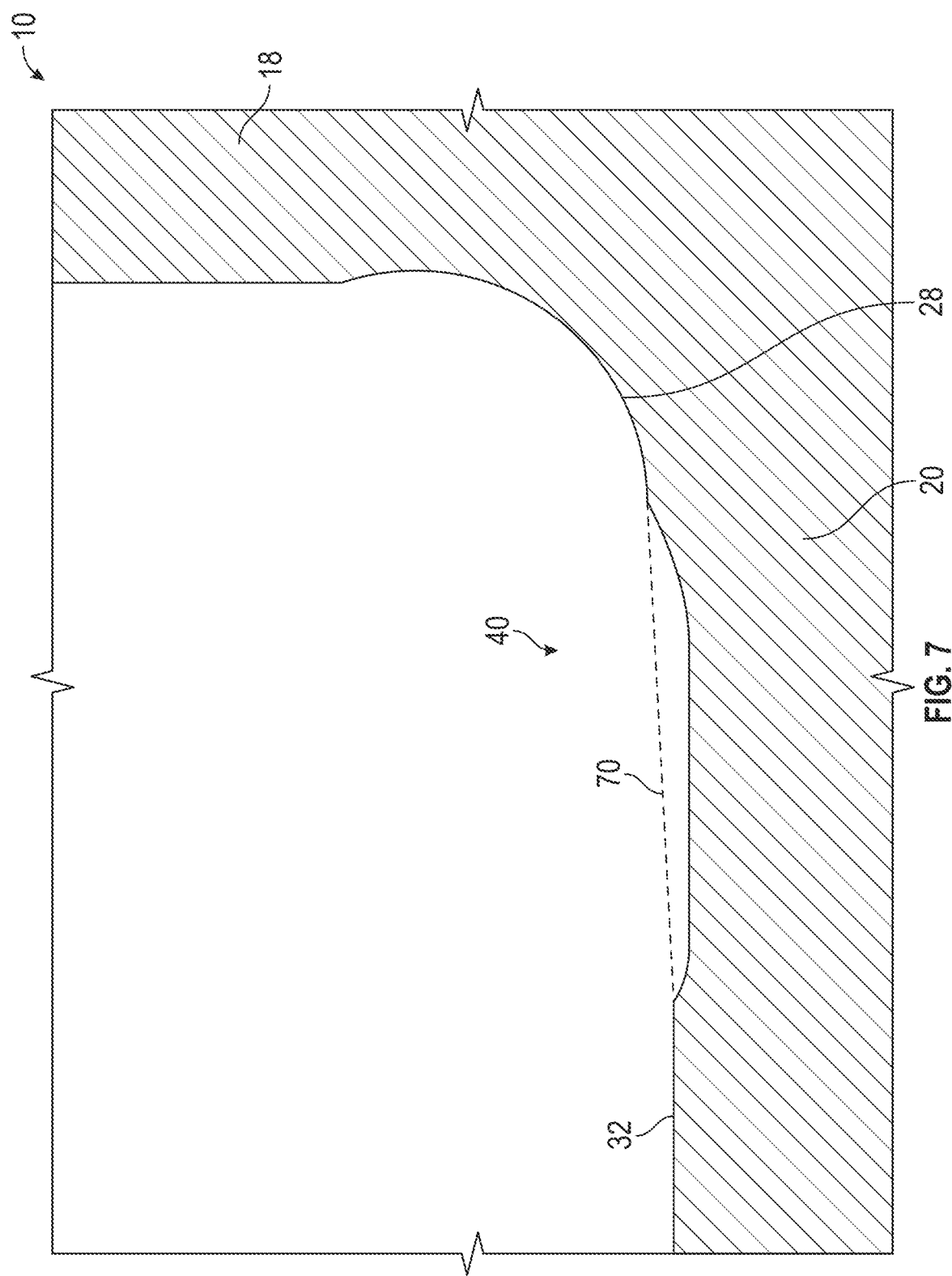

CRANKSHAFT REPAIR SYSTEM AND METHOD

BACKGROUND

Technical Field

Embodiments of the invention relate to a system and method for repairing a crankshaft, and the crankshaft so repaired, using laser cladding.

Discussion of Art

The crankshaft is the component of an internal combustion engine that transmits torque generated by the power cylinders to the drive assembly of the vehicle. Over the lifetime of an internal combustion engine, the crankshaft is subject to intense mechanical stresses that can produce cracks in the crankshaft and even result in total failure. A common source of these cracks is the connecting rod, which transmits the power generated by the power cylinder to the crankshaft. During varying operational conditions, the connecting rods may move axially and impact the crankshaft near the junction between the crankshaft web and the crank pin or crank journal. These impacts of the connecting rod relative to the crankshaft often increase operating temperatures and result in undesirable cracks.

Another common source of defects or cracks on the surface of a crankshaft is the heating and cooling of the crankshaft during varying operational conditions. As an engine heats and cools during and after operation, the crankshaft experiences fluctuating temperatures. Certain operation conditions may cause excessive heating of the crankshaft followed by rapid quenching. These conditions subject the crankshaft surface to intense stresses that can result in the formation of surface cracks. It may be desirable to have a system and method for repairing crankshafts that differs from those that are currently available.

BRIEF DESCRIPTION

A method is provided for repairing a crankshaft for an internal combustion engine by laser metal deposition. Suitable deposition methods may include laser cladding a metal additive onto a surface of a crankshaft. The surface receiving the cladding is the repair region, and may be prepared by undercutting any cracks or damaged portion of the crankshaft. The undercut recesses from the crankshaft (web) surface and extends into the body of the crankshaft. In the repair region, a cladding deposit is fused to the machined undercut on the crankshaft to repair a defect or crack on the crankshaft. The undercut may have a first arcuate section and a linear section. In the undercut, the first arcuate section of the undercut is dimensioned according to a first radius and the linear section is substantially parallel to the crankshaft surface. After the undercut is formed, the metal additive is laser cladded to the undercut to form a cladding deposit. The undercut may be dimensioned to remove the cracked area and also to accommodate sufficient cladding deposit for achieving an effective and reliable bond to the crankshaft.

A crankshaft for an internal combustion engine is provided having a laser cladding repair. The crankshaft may include crank pins, crank journals, and webs extending between the crank pins and the crank journals. Each web further may include a web surface on each side of the web. A repair region is provided on at least one web surface. Also included in the crankshaft is a cladding deposit. The cladding deposit is fused to the web surface in the repair region of the crankshaft. This process is performed such that the cladding deposit fills a machined undercut with the metal additive.

The web may include a pin collar, which is located adjacent to the crankshaft pin, and a journal collar, which is located adjacent to the crankshaft journal. In an embodiment, the repair region of the crankshaft is at least coextensive with either the pin collar of the web or the journal collar of the web. According to another aspect, the undercut is substantially U-shaped when viewed in vertical cross-section. In another embodiment, the undercut of the crankshaft may include a first arcuate section, a linear section and a second actuate section. In one embodiment, the linear section of the undercut may be about parallel to the web surface. The second arcuate section may be at an end of the linear section opposite the first arcuate section.

In one embodiment, the metal additive forming the cladding deposit may be a powdered metal alloy. According to another aspect of the crankshaft, the undercut also may include an undercut depth measured from the web surface. A suitable undercut depth may be dimensioned to be in a range of from about 0.01 inches to about 0.10 inches depending on application specific parameters. In an embodiment, the web of a crankshaft repaired using the method has at least one crack having a crack depth measured from the web surface. A suitable undercut depth may be dimensioned to be at least twice of the measured crack depth. According to another aspect of the crankshaft, the cladding deposit is laser cladded to the undercut. The laser cladding operation forms a bond between the metal additive of the cladding deposit and the undercut. The cladding deposit of the crankshaft further has a hardness property. In an embodiment, the cladding deposit hardness is greater than a hardness of the web.

A method of repairing a crankshaft for an internal combustion engine is also provided. The method may include first identifying one or more cracks on the crankshaft. After one or more cracks have been identified, the method may include machining the crankshaft at a repair region to a depth that removes the deepest crack. In this step, an undercut is formed in the crankshaft such that the undercut is recessed from a web surface of a web of the crankshaft. Next, the method may include cladding the metal additive to the undercut of the crankshaft. As the metal additive is cladded to the undercut, a cladding deposit is formed in the repair region of the crankshaft. The cladding deposit may fill the undercut.

According to an aspect of the method, the web may include a pin collar, which is located adjacent to a crankshaft pin, and a journal collar, which is located adjacent to a crankshaft journal. This embodiment further provides that the repair region is at least coextensive with either the pin collar of the web or the journal collar of the web. According to another aspect of the method, the cladding may include a second step of laser cladding. The second step of laser cladding may be performed after cladding deposit has already been formed in the undercut.

The method for repairing a crankshaft may include identifying a crack depth from the one or more cracks in an embodiment. After a crack depth is identified, a step of determining an undercut depth of the undercut based on the measured crack depth is included. The undercut depth of the method may be determined to be at least twice the measured crack depth. In an embodiment, the method of repairing a crankshaft also may include machining the cladding deposit to form a final profile of the repair region in the embodiment.

BRIEF DESCRIPTION OF THE DRAWINGS

FIGS. 4A-C are photographs of fragmentary vertical cross-sections of a defective crankshaft showing cracks in the web of the crankshaft;

FIG. 7 is an enlarged fragmentary cross-section of the pin collar or journal collar region showing the repaired profile.

DETAILED DESCRIPTION

Figure 1:
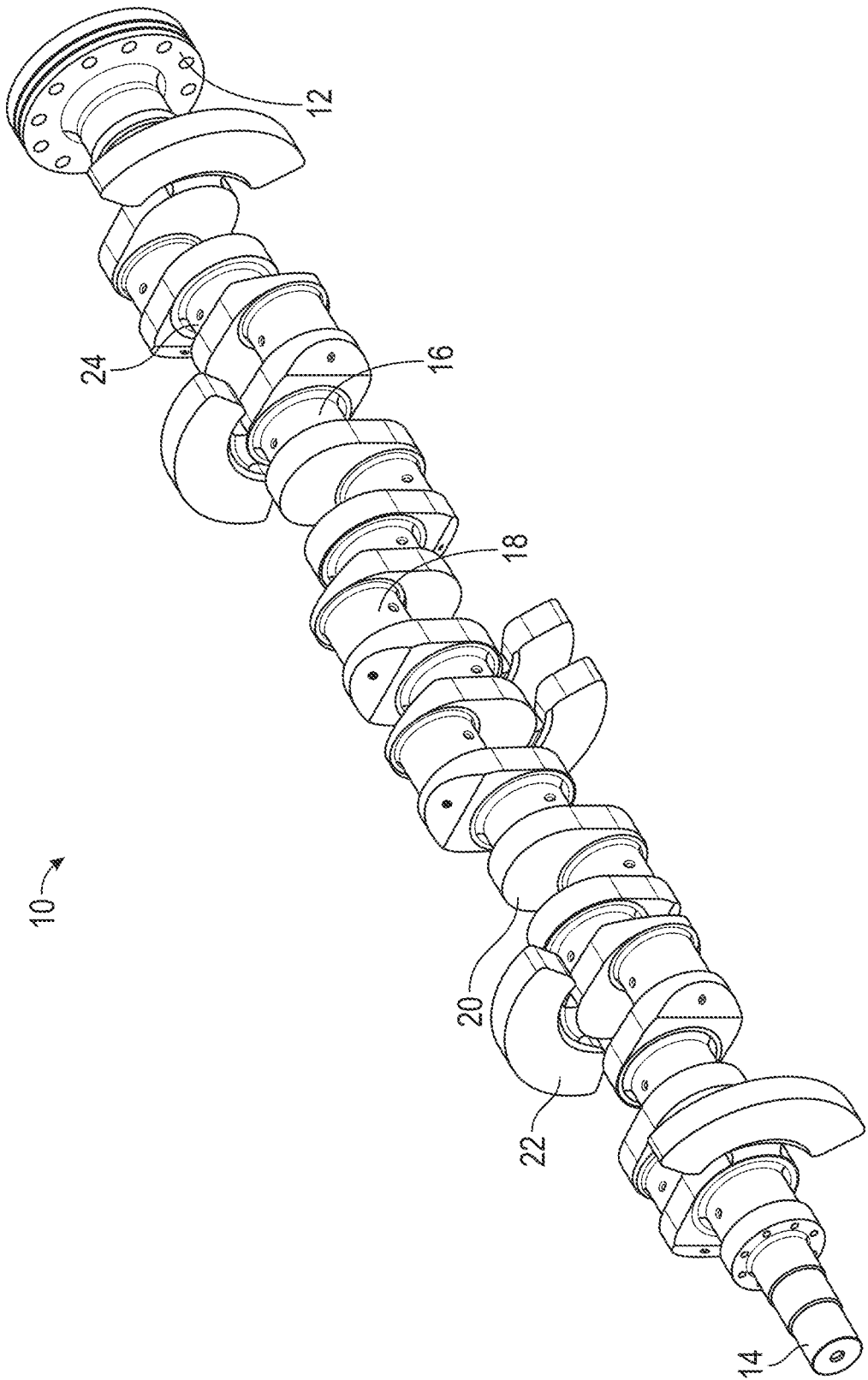
FIG. 1 is a top perspective view of the crankshaft.

Referring now to FIG. 1, a crankshaft 10 for an engine is provided. A suitable engine may be a diesel engine, and a suitable diesel engine may be useful in a locomotive. Other types of engine crankshafts may be utilized in other vehicles. The crankshaft 10 may include a flywheel mount 12 and a crank nose 14 on opposing ends. Between the flywheel mount 12 and the crank nose 14 is a plurality of crank journals 16, which are disposed coincidental with the primary axis of the crankshaft 10, and a plurality of crank pins 18, which are perpendicularly offset from the primary axis of the crankshaft 10 and define a parallel axis. Connecting rods of pistons (not shown) in the diesel engine may be coupled to the crank journals 16 and cause rotation of the crankshaft 10 while in operation.

As shown in FIG. 1, the crank journals 16 and the crank pins 18 alternate along the length of the crankshaft 10. Webs 20 of the crankshaft 10 connect the alternating crank journals 16 and crank pins 18 and extend transversely to the respective journals and pins. The crankshaft 10 may be fabricated as a single unit, with the crank journals 16, the crank pins 18 and the webs 20 integrally joined together. To balance the crankshaft while in operation, counterweights 22 are provided at designated intervals along the length of the crankshaft 10 and are connected to designated webs 20 that vary with the particular application. The counterweights 22 primarily reduce forces on bearings of the crankshaft 10 by counteracting the forces applied to the crankshaft by the connecting rods. A thrust bearing is coupled to the crankshaft 10 and limits axial movement of the crankshaft while in operation. While the thrust bearing is not shown in FIG. 1, the location 24 at which the thrust bearing is coupled to the crankshaft 10 is identified. Depending on the particular application, the location 24 of the thrust bearing along the crankshaft 10 may be variable.

Figure 2:
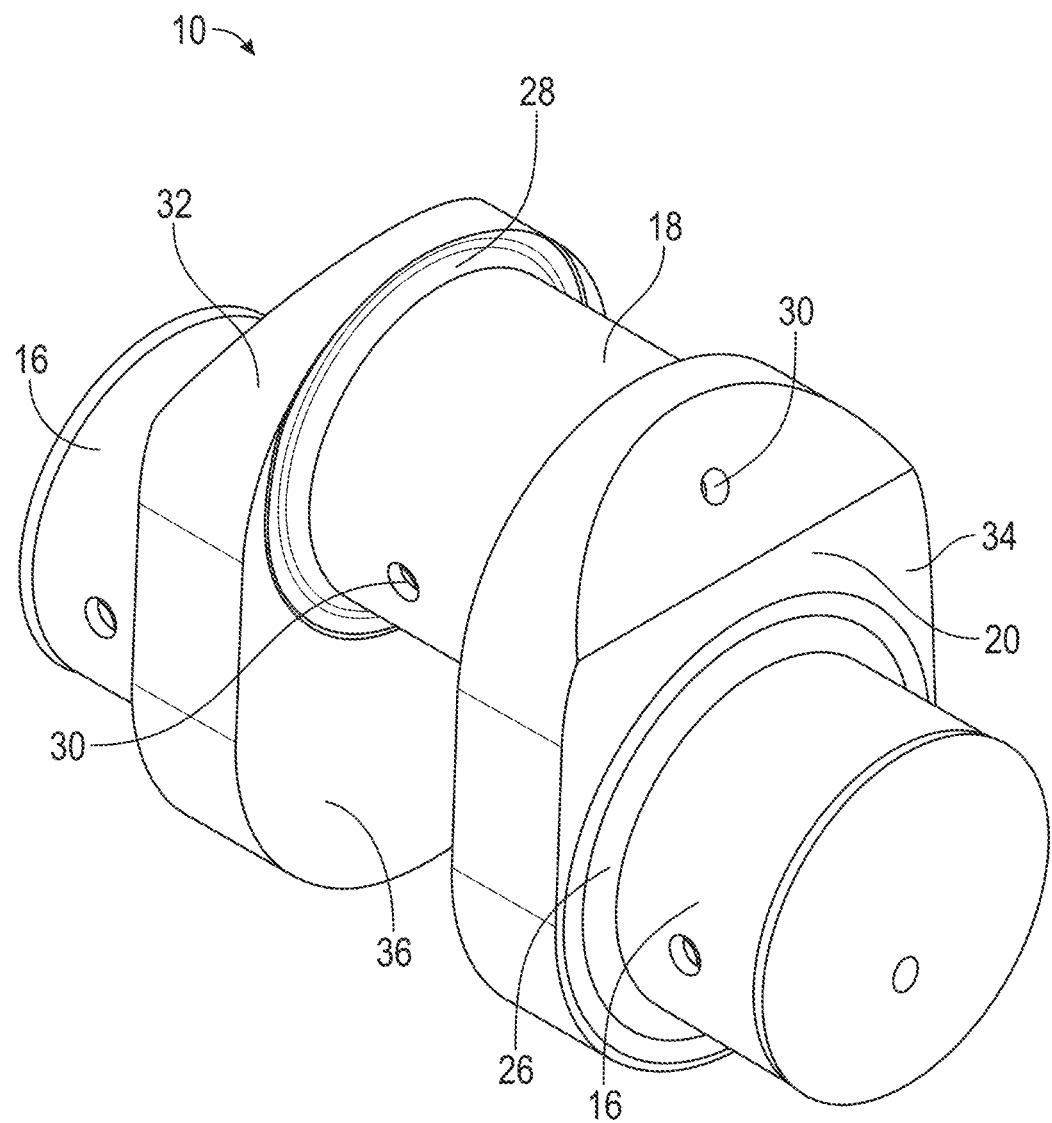
FIG. 2 is an enlarged fragmentary top perspective view of the crankshaft of FIG. 1.

Referring now to FIG. 2, an enlarged fragmentary view shows the crank pin 18 connected to adjacent crank journals 16 by the web 20, as described above. At the junction of the crank journals 16 and the web 20, journal collars 26 are formed in the web 20. Likewise, pin collars 28 are formed in the web 20 at the junction of the crank pin 18 and the web 20. Lubrication apertures 30 are provided on the surfaces of the crank journals 16, the crank pins 18, and the webs 20 to allow lubricant to flow within and around the crankshaft 10 to cover the surfaces of the crank journals, crank pins, and webs. The webs 20 each include a web surface 32 having an outer web surface 34 facing the crank journal 16 and an inner web surface 36 facing the crank pin 18. The journal collars 26 are formed on the outer web surface 34, and the pin collars 28 are formed on the inner web surface 36.

Referring now to FIGS. 3 and 4A-C, after continued operation of the diesel engine, the crankshaft 10 is subject to intense mechanical stresses that may result in damaging defects. In particular, surface defects such as cracks 38 may develop at the journal collars 26 and the pin collars 28. Surface defects 38 are known to form at the journal collars 26 or the pin collars 28 due to varying operational conditions of the diesel including the heating and cooling of the crankshaft 10, among others.

Figure 3:
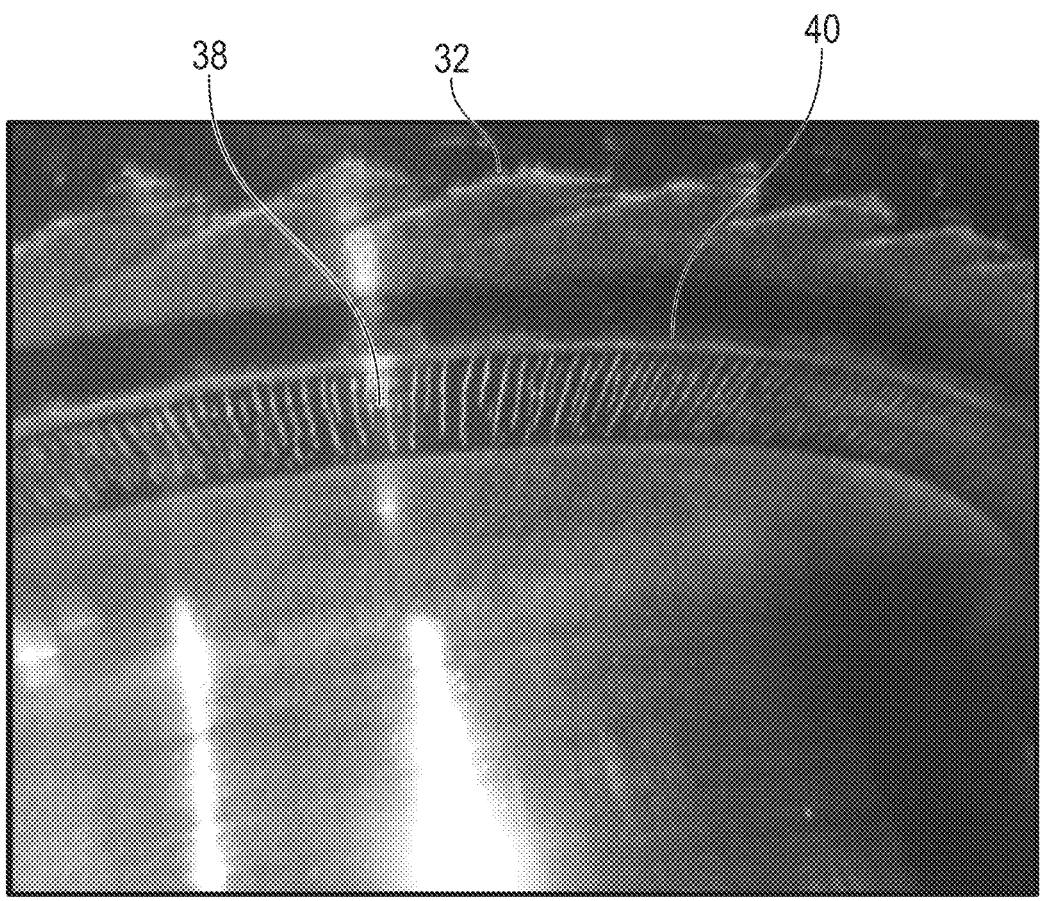
FIG. 3 is a photograph of a crankshaft showing cracks in the web of the crankshaft.

FIGS. 3 and 4A-C show the defects or cracks 38 on the web surface 32 of the web 20. The cracks 38 are located on a repair region 40 of the web 20, which is described in greater detail below. As shown in FIG. 3, a plurality of the cracks 38 often form on the outer web surface 34 or the inner web surface 36. When multiple cracks 38 have formed, as shown in FIGS. 3 and 4C, the repair region 40 may encompass all of the cracks 38. FIGS. 4A and 4B show a depth 42 of the cracks 38. The depth 42 of cracks 38 ranges from about 0.01 inch to 0.10 inch. However, the crankshaft 10 and method for repairing the crankshaft may be utilized to repair cracks 38 of different depths and/or at different angles and/or having different crack widths. FIGS. 4A and 4B show cracks 38 that form at an acute angle relative to the web surface 32 before extending generally perpendicularly into the web. The crankshaft and method for repairing crankshaft may repair cracks or defects of varying shapes and sizes.

Figure 5:
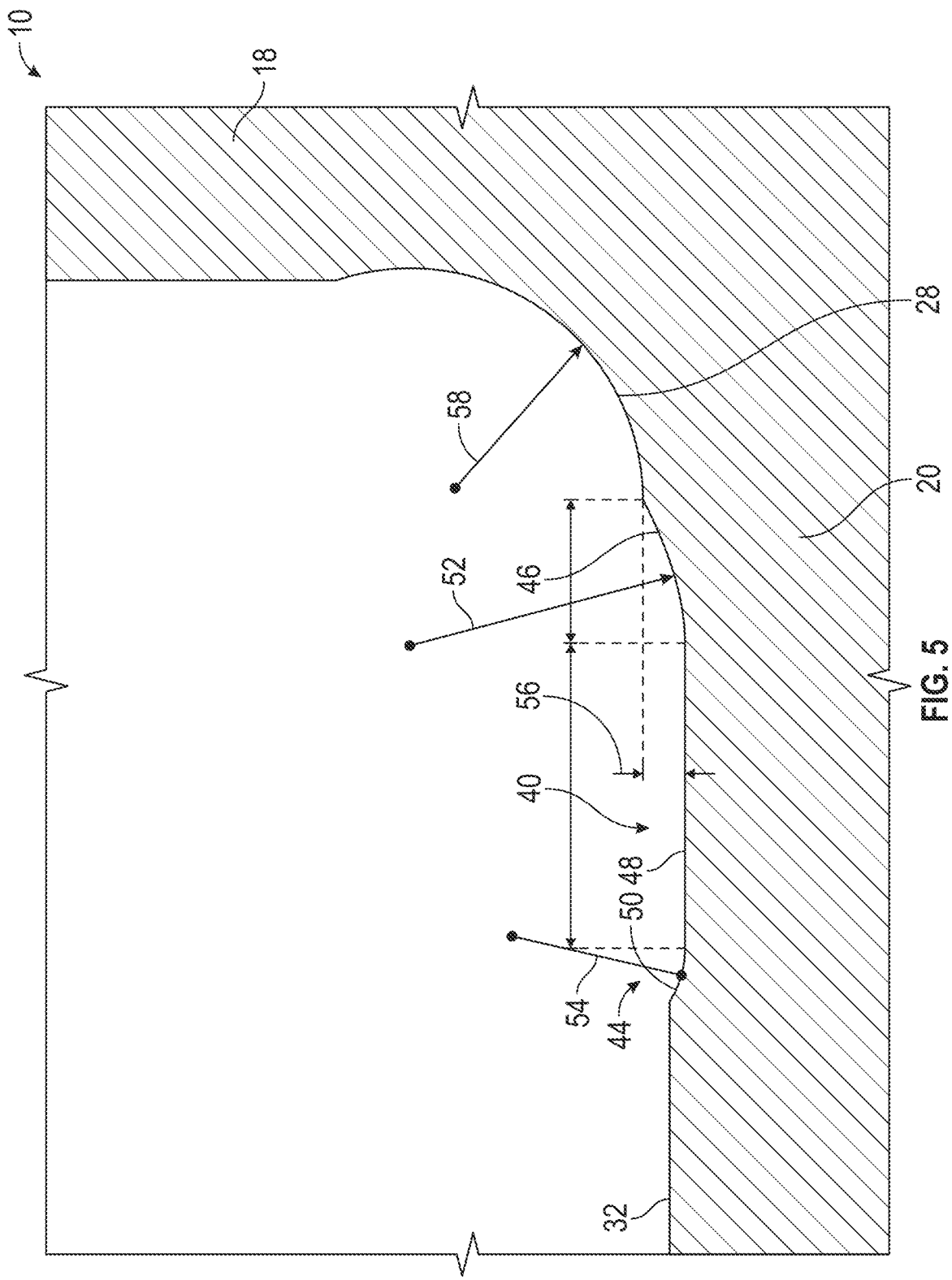
FIG. 5 is an enlarged fragmentary cross-section of the pin collar or journal collar of the web showing the undercut and associated dimensions.

Referring now to FIG. 5, an undercut 44 on the web surface 32 may be machined at the repair region 40 of the web after defects or cracks are identified. Additionally, the web of the crankshaft may be formed with an undercut during initial manufacturing of the crankshaft. Once machined, the undercut extends through the web surface and into the body of the crankshaft. The inner surface that defines the repair region may be cleaned, surface treated, abraded and the like. The surface preparation may remove oils, oxidation and debris to facilitate better surface bonding.

A suitable repair region may be at least coextensive with the journal collar or the pin collar on the web surface of the web. In an embodiment, the repair region may extend around at least a majority of a circumference of the journal collar or the pin collar. Additionally, the repair region or regions may be located adjacent to or around the circumference of the journal collar or the pin collar. The repair region disposition is influenced by the location(s) where defects or cracks have developed. The repair region 40 may encompass all defects or cracks 38 identified. As such, the repair region may extend on both the journal collar or the pin collar and other regions of the web surface. Alternatively, the repair region may be located entirely on other regions of the web surface. Further, plural repair regions may be determined if cracks or defects are not near each other.

A suitable undercut may have a first arcuate section 46, a linear section 48, and a second arcuate section 50. In the undercut 44, the first arcuate section 46 is defined by a first radius 52, and the second arcuate section 50 is defined by a second radius 54. Depending on application specific parameters, the first radius 52 may be dimensioned in a range of from about 0.25 inch to about 0.5 inch. The linear section 48 extends about parallel to the web surface 32. All defects or cracks 38 may be removed by the machining of the linear section 48 of the undercut 44.

Figure 6:
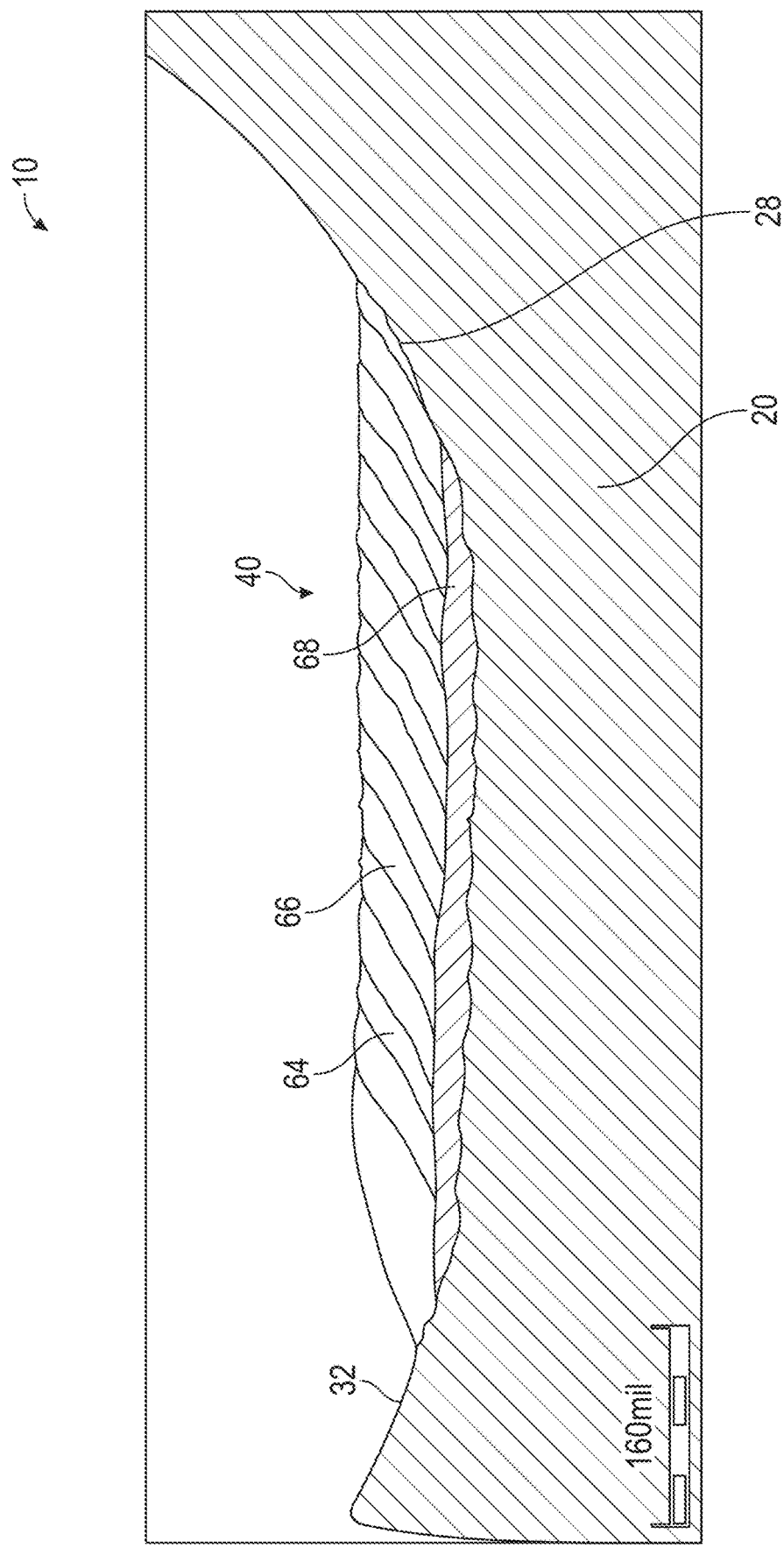
FIG. 6 is an enlarged cross-section like FIG. 5 showing the filled in undercut which represents the repaired area.

Referring now to FIGS. 5 and 6, in the linear section 48, the undercut 44 may include an undercut depth 56 measured from the web surface 32. Preferably, the undercut depth 56 is determined to be twice as deep as the greatest crack depth 42 in the repair region 40. However, the undercut depth 56 may be in a range of from about 0.01 inches to about 0.10 inches depending on application specific parameters. The dimensions of the undercut 44 may allow it to receive a cladding deposit 64.

Also indicated in FIG. 5 is a web radius 58. The radius is defined as a fillet between the web and the journal collar or the web and the pin collar. Thus, the web radius is formed in the journal collar or pin collar of the web.

FIG. 6 shows the cladding deposit after it has been fused into the repair region. After the undercut has been machined into the profile shown in FIG. 5, a metal additive 66 is fused to the inner surface of the undercut to form the cladding deposit. This process may be performed by laser cladding. However, alternative metal bonding methods may be selected for use based on application specific parameters. A suitable metal additive may include a stainless-steel alloy. Suitable alloys may include 420 SS or ER80S. In other embodiments, the metal additive may include one or more suitable filler metals. These suitable metal fillers may include a metal of the same composition of the crankshaft.

The laser cladding process allows for direct metal deposition of the metal additive 66 to form the cladding deposit. Laser cladding may form a metallurgical bond by fusing the metal additive to the inner surface of the undercut. This bond formed by the laser cladding operation results in the repaired web that exhibits favorable mechanical properties. In particular, the web at the repaired journal collar or the repaired pin collar may exhibit higher strength and hardness than known repair methods. The strength, duration and frequency of the laser may be selected with reference to the metal powder being used, the desired properties of the cladding deposit, the existing properties of the crankshaft body, the depth of the undercut, and the like. The angle of the laser may be selected with reference to the depth and configuration of the undercut.

As seen in FIG. 6, the original profile and dimensions of the undercut 44 become slightly altered as the undercut surface fuses to the cladding deposit 64 during laser cladding. The laser cladding process creates a heat affected zone 68 where the metal additive is adjoined to the undercut. While direct metal deposition processes may result in brittle regions having decreased strength, brittle regions in the heat affected zone of the repaired web of the disclosure may be reduced. The heat affected zone may be controlled or reduced such that the repaired web 20 exhibits improved strength due to the laser cladding of the metal additive to the undercut having the dimensions shown in FIG. 5.

Optionally, the laser may pass over the cladding deposit for a second time in a second procedure after the initial laser cladding procedure has already formed the cladding deposit. This second procedure may temper or reduce brittleness in regions and may increase the mechanical properties of the cladding deposit. Here, the second procedure may optionally be performed without the inclusion of additional metal additive 66, such that only the laser passes over the cladding deposit 64.

Referring now to FIG. 7, after the cladding deposit has been formed, the cladding deposit may be machined to a repaired profile 70 relative to the web. Alternatively, the cladding deposit may be laser cladded such that it is formed in repaired profile 70, thereby eliminating or reducing the need for the aforementioned machining step.

The above description is illustrative, and not restrictive. For example, the above-described embodiments (and/or aspects thereof) may be used in combination with each other. In addition, many modifications may be made to adapt a particular situation or material to the teachings of the subject matter without departing from its scope. While the dimensions and types of materials described herein define the parameters of the subject matter, they are exemplary embodiments. Other embodiments will be apparent to one of ordinary skill in the art upon reviewing the above description. The scope of the subject matter should, therefore, be determined with reference to the appended claims, along with the full scope of equivalents to which such clauses are entitled.

This written description uses examples to disclose several embodiments of the subject matter, including the best mode, and to enable one of ordinary skill in the art to practice the embodiments of subject matter, including making and using any devices or systems and performing any incorporated methods. The patentable scope of the subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A crankshaft for an internal combustion engine comprising:
at least one crank pin;
at least one crank journal;
at least one web extending between the at least one crank pin and the at least one crank journal, the web having a web surface with a portion of the web surface defining a repair region that is an undercut that extends into the body of the crankshaft; and
a cladding deposit fused to the web surface in the repair region, the cladding deposit being formed by cladding a metal additive to the undercut;
wherein the web further comprises a pin collar adjacent to the at least one crank pin and a journal collar adjacent to the crank journal;
wherein cladding comprises:
a first laser cladding, wherein the cladding deposit is formed in the undercut via the first laser cladding; and
a second laser cladding after the cladding deposit is formed in the undercut via the first cladding.

2. The crankshaft of claim 1, the web further comprising a pin collar adjacent to the crankshaft pin and a journal collar adjacent to the crankshaft journal,
wherein the repair region is at least coextensive with at least one of the pin collar and the journal collar of the web.

3. The crankshaft of claim 1, wherein the undercut is substantially U-shaped when viewed in a vertical cross-section.

4. The crankshaft of claim 1, the undercut further comprising a first arcuate section and a linear section that is parallel to the web surface.

5. The crankshaft of claim 4, the undercut further comprising a second arcuate section.

6. The crankshaft of claim 1, wherein the cladding deposit is formed from a powdered metal alloy.

7. The crankshaft of claim 1, the undercut further comprising an undercut depth from the web surface, wherein the undercut depth is dimensioned in a range of from about 0.01 inch to about 0.10 inch.

8. The crankshaft of claim 1, wherein the cladding deposit is fused to the undercut by laser cladding.

9. The crankshaft of claim 1, wherein the cladding deposit has a hardness that is greater than a hardness of the web.

10. A method of repairing a crankshaft, comprising:
   machining the crankshaft at a repair region encompassing at least one crack to form an undercut extending through a web surface of a web and into a body of the crankshaft; and
   cladding a metal additive to the undercut to form a cladding deposit in the repair region, the cladding deposit filling the undercut;
wherein the web further comprises a pin collar adjacent to a crank pin and a journal collar adjacent to a crank journal;
wherein cladding comprises laser cladding; and
wherein the laser cladding comprises a second step of laser cladding the cladding deposit after the cladding deposit is formed in the undercut via a first cladding step.

11. The method of claim 10, wherein the web furthered comprises a pin collar adjacent to a crankshaft pin and a journal collar adjacent to a crankshaft journal, wherein the repair region is at least coextensive with at least one of the pin collar and the journal collar of the web.

12. The method of claim 11, further comprising machining the undercut to a substantially U-shaped cross sectional profile.

13. The method of claim 11, further comprising machining the undercut to form a first arcuate section, and a linear section that is substantially parallel to the web surface.

14. The method of claim 11, further comprising machining the undercut to a depth that is dimensioned in a range of from about 0.01 inch to about 0.10 inch.

15. The method of claim 10, further comprising feeding a metal powder into the undercut during the cladding step.

16. The method of claim 10, further comprising determining an undercut depth based at least in part on a depth of the at least one crack.

17. The method of claim 16, further comprising determining the undercut depth to be at least twice the crack depth.

18. The method of claim 10, further comprising machining the cladding deposit to a repaired profile of the repair region.

* * * * *